No. 794,325. PATENTED JULY 11, 1905.
S. STOUT, H. K. HARNESS & J. LADNER.
WATER SCREEN AND FILTER.
APPLICATION FILED JULY 30, 1904.

Witnesses

Stephen Stout
Homer K. Harness
John Ladner
Inventors by C. A. Snow & Co.
Attorneys No. 794,325. Patented July 11, 1905.

UNITED STATES PATENT OFFICE.

STEPHEN STOUT, HOMER K. HARNESS, AND JOHN LADNER, OF AXTELL, KANSAS.

WATER SCREEN AND FILTER.

SPECIFICATION forming part of Letters Patent No. 794,325, dated July 11, 1905.

Application filed July 30, 1904. Serial No. 218,903.

*To all whom it may concern:*

Be it known that we, STEPHEN STOUT, HOMER K. HARNESS, and JOHN LADNER, citizens of the United States, residing at Axtell, in the county of Marshall and State of Kansas, have invented a new and useful Water Screen and Filter, of which the following is a specification.

This invention relates to filters, and has for its objects to produce a comparatively simple and inexpensive device of this character which may be readily employed in connection with service-pipes and may when circumstances require be quickly and thoroughly cleaned.

To these ends the invention comprises the novel features of construction and combination of parts more fully hereinafter described.

Figure 1:
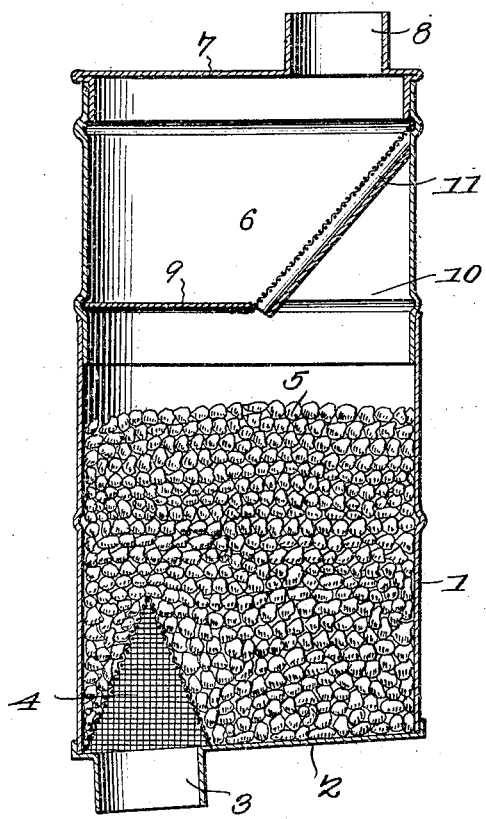
Figure 2:
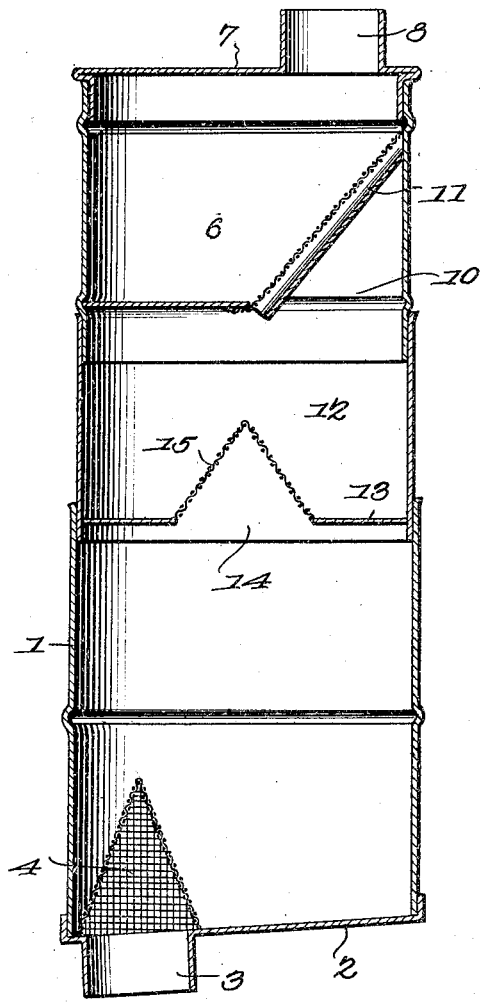
Figure 3:
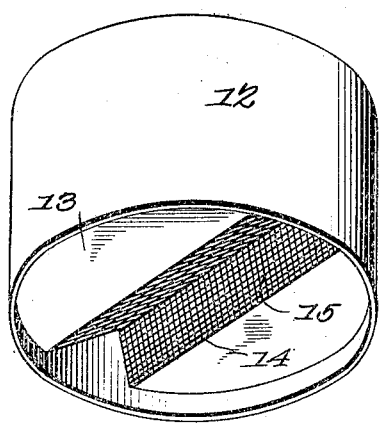

In the accompanying drawings, Figure 1 is a central longitudinal section through a filter embodying the invention. Fig. 2 is a similar view illustrating another form of embodiment of the invention. Fig. 3 is a perspective view of the auxiliary collecting-pan as employed in the device of Fig. 2.

Referring to the drawings, 1 designates a vessel or receptacle having in its bottom 2 a discharge-opening 3, over which is disposed a conical shield 4, of wire-gauze or other suitable open-work or reticulated material, soldered or otherwise secured around the margin of its base to the adjacent face of the bottom 2.

In practice the vessel receives a charge of granulated or other suitable filtering material 5, which may consist of charcoal or a combination of charcoal and sand, and over this filtering material there is seated in the upper end of the vessel a primary removable section or pan 6, upon the upper end of which there is in turn seated a cap or closure 7, provided with an inlet-opening 8. The section or pan 6 has a portion of its bottom 9 removed to provide an opening 10, over which is disposed an inclined open-work strainer or deflector 11, arranged directly beneath the inlet-opening 8 and adapted as the water or other liquid enters through said opening to strain or screen therefrom the coarser or heavier impurities—such as leaves, sticks, &c.—and to deflect such impurities for collection within the pan 6.

It is to be noted that the inlet-opening 8 is arranged diametrically out of alinement with the discharge-opening 3, whereby the liquid in passing through the apparatus will percolate practically through the entire body or mass of filtering material, thereby becoming thoroughly cleansed before being discharged. It is further to be observed that in practice the apparatus may be readily cleaned by removing the cover 7, thus having access to the pan 6 and, furthermore, by removing the section or pan 6 for having access to the filtering material within the vessel 1.

In Fig. 2 there is disclosed a construction which is identical with that above set forth, except that in this instance I have disclosed the device as provided with an auxiliary removable collecting-pan 12, having formed transversely across its bottom 13 an enlarged central opening 14, over which is arranged an open-work deflector 15, composed of wire-netting or other appropriate material and preferably of substantially V shape in cross-section, whereby its inclined walls serve to deflect particles of matter detained in the liquid. This auxiliary pan is seated in the vessel 1 over the filtering material and in turn receives in its upper end the primary collecting-pan 6. In other respects the construction and operation of the apparatus are identical with that heretofore described.

A very important advantage of the present invention resides in the inclined screens 11 and 15, which operate as chutes to direct leaves and all other kinds of trash to one side of the adjacent outlet-openings 10 and 14, thereby to prevent the accumulation of trash upon the screens, and thus prevent choking of the screens.

From the foregoing it is apparent that we produce a simple inexpensive device admirably adapted for the attainment of the ends in view, it being understood that minor changes in the details of construction herein set forth may be resorted to without departing from the spirit of the invention.

Having thus described the invention, what is claimed is—

A device of the class described comprising upper and lower removable telescoped sections, the lower section having a bottom pierced by an outlet-pipe, a screen-covering for the upper end of the outlet-pipe, filtering material within the lower section, the upper section having a bottom located in the lower section and provided with an outlet-opening, an inclined screen covering the opening in the bottom of the upper section, and a cover removably carried by the upper section and provided with an inlet-pipe alined above the screen.

In testimony that we claim the foregoing as our own we have hereto affixed our signatures in the presence of two witnesses.

STEPHEN STOUT.
   HOMER K. HARNESS.
   JOHN LADNER.

Witnesses:
 W. S. McKelvy,
 C. M. Tabor.